Dec. 23, 1947.  E. V. BUKOLT  2,433,023
ADJUSTABLE SUPPORT
Filed July 9, 1946  2 Sheets-Sheet 1
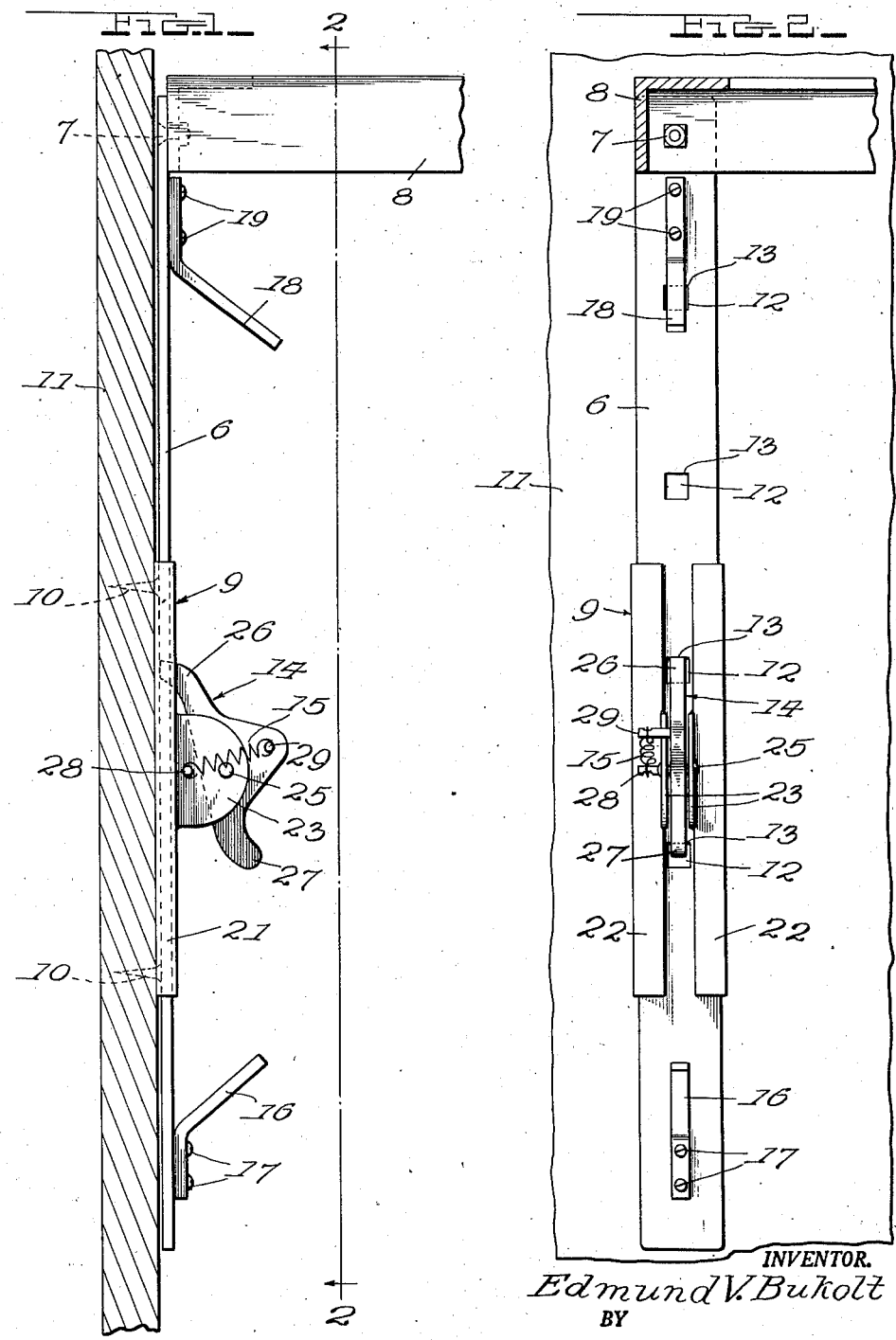
INVENTOR.
Edmund V. Bukolt
BY
H. B. Wilieson &Co.
atty.

Dec. 23, 1947.   E. V. BUKOLT   2,433,023
ADJUSTABLE SUPPORT
Filed July 9, 1946   2 Sheets-Sheet 2
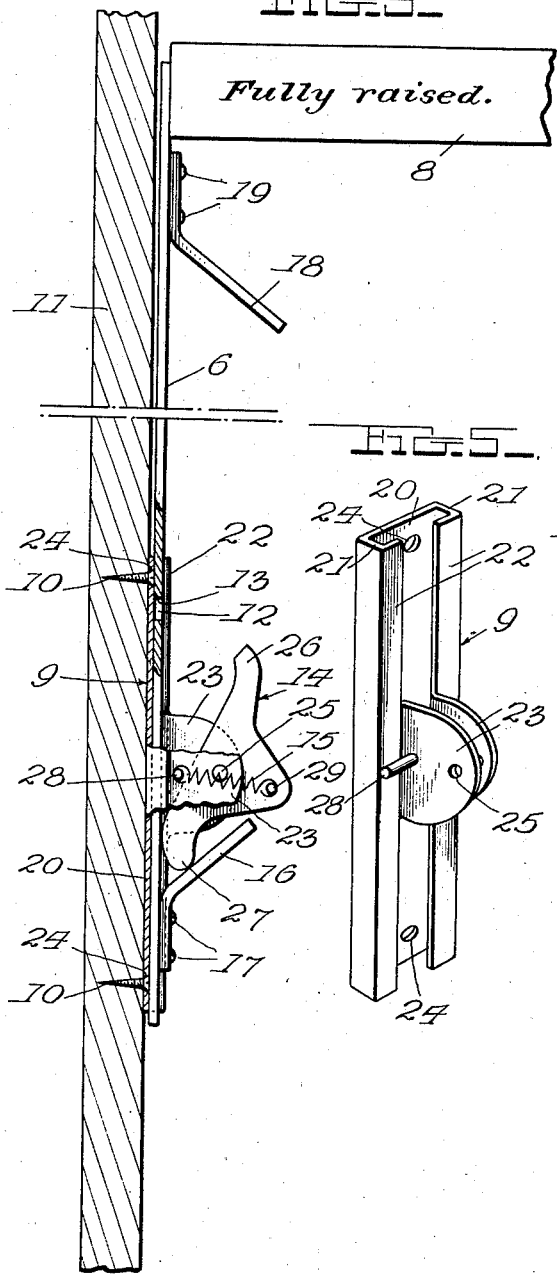
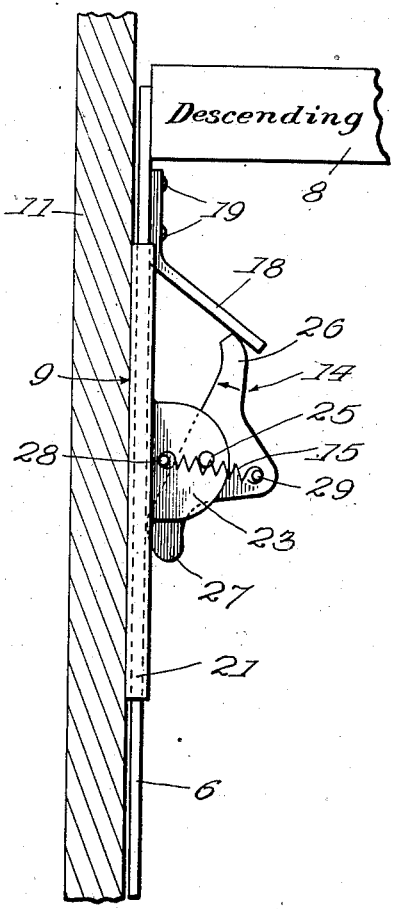
INVENTOR.
Edmund V. Bukolt
BY
H. B. Willson & Co.
atty.

Patented Dec. 23, 1947

2,433,023

UNITED STATES PATENT OFFICE 2,433,023

ADJUSTABLE SUPPORT

Edmund V. Bukolt, Stevens Point, Wis.

Application July 9, 1946, Serial No. 682,277

4 Claims. (Cl. 248—223)

The invention relates to a new and improved support intended primarily for use in mounting the mattress-supporting spring frame of a child's crib for movement to different elevations and for supporting it at any selected elevation, four of the supports being used for this or similar purposes.

Each support includes two slidably engaged members for connection with the spring frame and the crib frame respectively, and a spring-pressed dog mounted on one of said members for successive engagement with abutments on the other of said members as the spring frame is raised, to hold said spring frame in successively higher positions; and the principal object of the invention is to make novel provision whereby said dog is moved to released position by extreme raising of said spring frame, and is moved again to operative position by extreme lowering of said spring frame.

Another object is to provide a simple and inexpensive, yet durable construction which will be trouble-free.

Figure 1 of the accompanying drawings is a side elevation of one of the supports connected with a crib frame and a spring frame, the latter being shown in one of its vertically adjusted positions.

Fig. 2 is a vertical sectional view on line 2—2 of Fig. 1.

Fig. 3 is a view similar to Fig. 1 but showing the spring frame fully raised and the dog moved to inoperative position.

Fig. 4 is a view similar to Fig. 1 but illustrating the spring frame lowered almost to its extreme position and showing the dog starting from inoperative toward operative position.

Fig. 5 is a perspective view of the dog-carrying guide.

A preferred construction has been illustrated and will be specifically described, with the understanding, however, that within the scope of the invention as claimed, minor variations may be made.

A vertically elongated, flat-sided bar 6 is suitably connected at 7, at its upper end, to the spring frame 8 of a crib, and a vertically elongated guide 9 which slidably receives said bar 6, is connected at 10 with one of the ends 11 of the crib frame. The bar 6 is formed with vertically spaced openings 12, the upper edges 13 of which constitute downwardly facing abutments. A dog 14 mounted on the guide 9, is cooperable with these abutments to support the bar 6 in different vertically adjusted positions. A spring 15 acts on the dog 14 and reacts on the guide 9 to yieldably hold said dog in cooperative relation with the bar 6 (Fig. 1) or in an inoperative position (Figs. 3 and 4). One cam finger 16 is secured at 17 to the lower end of the bar 6 for moving the dog 14 from the operative position of Fig. 1 to the inoperative position of Fig. 3 when the bar 6 is raised to the extreme as shown in the latter view. Another cam finger 18 is secured at 19 to the bar 6, near its upper end, to move the dog 14 from the inoperative position of Figs. 3 and 4 back into cooperative relation with the bar 6, when this bar is lowered to the extreme, as will be clear from Fig. 4. With the bar 6 in fully lowered position and the dog in cooperative relation with said bar, the dog will successively engage the abutments 13 as said bar is raised, whereby the spring frame 8 may be supported at any selected elevation. Whenever the spring frame is to be lowered from any selected position, it is simply necessary to raise it to the maximum, thereby releasing the dog 14 (Fig. 3) whereupon complete lowering of said spring frame will again swing the dog into cooperative relation with the bar (see Fig. 4). Then, the spring frame may be raised to any other selected position and the dog will hold it in such position.

In the construction shown, the guide 9 is formed from a single metal stamping which is shown most clearly in Fig. 5, said stamping providing a flat vertical plate 20 slidably contacting with one side of the bar 6, two edge flanges 21 on said plate 20 and contacting with the edges of said bar 6, two other vertical flanges 22 projecting inwardly from the flanges 21 and lying against the other side of bar 6, and two parallel ears 23 projecting laterally outward from the inner edges of said flanges 22 and disposed at about the centers of the latter. The plate 20 is formed with openings 24 to receive attaching screws or the like.

The dog 14, in the construction shown, is of substantially T-shape and is pivotally mounted at 25 between the ears 23, said dog having a nose 26 above the pivot 25, and a tail 27 below said pivot, said nose being successively engageable with the abutments 13 as the bar 6 is raised. This nose also coacts with the upper cam finger 18 to move the dog from inoperative to operative position when the bar 6 is fully lowered (see Fig. 4), and the tail 27 is cooperable with the lower cam finger 16 to move the dog from operative to inoperative position when bar 6 is fully raised (Fig. 3). The spring 15 is preferably a tension spring acting at opposite sides of a dead center line with respect to the pivot 25, to not only yieldably hold the dog 14 in one position or the other, but to aid in quickly snapping it to said position after it is once started by one or the other of the cam fingers. I have shown an anchoring pin 28 projecting laterally from one of the ears 23 for anchoring one end of the spring 15, and another lateral pin 29 on the dog 14 for connecting the other end of said spring with said dog.

From the foregoing, taken in connection with the accompanying drawings, it will be seen that novel and advantageous provision has been made for attaining the desired end, and while preferences have been disclosed, attention is again invited to the possibility of making variations within the scope of the invention as claimed. While four of the supports are illustrated supporting a spring frame in a child's crib, it is obvious that one, two or more of the supports may be used for adjustably supporting one member with respect to another.

I claim:

1. An adjustable support comprising a bar for connection with one member, a guide for connection with another member, said bar being slidably engaged with said guide and having longitudinally spaced abutments, a dog mounted on said guide for movement into and out of cooperative relation with said abutments, spring means acting on said dog and reacting on said guide for yieldably holding said dog in either operative or inoperative position, fixed means on said bar for moving said dog from operative position to inoperative position when said bar and guide are relatively slid to the maximum in one direction, and additional fixed means on said bar for moving said dog from inoperative position to operative position when said bar and slide are relatively slid to the maximum in the other direction, said dog having portions cooperable with said fixed means for effecting said dog movements.

2. An adjustable support comprising a bar for connection with one member, a guide for connection with another member, said bar being slidably engaged with said guide and having longitudinally spaced abutments, a dog mounted on said guide for movement into and out of cooperative relation with said abutments, spring means acting on said dog and reacting on said guide for yieldably holding said dog in either operative or inoperative position, fixed means on said bar for moving said dog from operative position to inoperative position when said bar and guide are relatively slid to the maximum in one direction, and additional fixed means on said bar for moving said dog from inoperative position to operative position when said bar and slide are relatively slid to the maximum in the other direction, said dog being pivotally mounted and having an abutment-engaging nose at one side of its pivot and a tail at the other side of said pivot, said nose being cooperable with one of said fixed means to cause movement of said dog from inoperative to operative position, said tail being engageable with the other of said fixed means to cause movement of said dog from operative to inoperative position.

3. A structure as specified in claim 2; said fixed means each consisting of a cam finger oblique to said bar.

4. A structure as specified in claim 2; said slide consisting of a flat plate contacting with one side of said bar, edge flanges on said plate contacting with the edges of said bar, other flanges projecting inwardly from said edge flanges and contacting with the other side of said bar, and parallel ears projecting outwardly from the inner edges of said other flanges and disposed at opposite sides of said dog, said dog being pivoted to said ears, having an abutment-engaging nose at one side of its pivot and a tail at the other side of said pivot, said nose being cooperable with one of said fixed means to cause movement of said dog from inoperative to operative position, said tail being engageable with the other of said fixed means to cause movement of said dog from operative to inoperative position.

EDMUND V. BUKOLT.